United States Patent
Cheng et al.

(10) Patent No.: US 6,185,235 B1
(45) Date of Patent: Feb. 6, 2001

(54) LASERS WITH LOW DOPED GAIN MEDIUM

(75) Inventors: Emily Cheng, Sunnyvale; Dave R. Dudley, El Granada; William L. Nighan, Jr., Menlo Park; James D. Kafka, Mountain View; David E. Spence, Sunnyvale; David S. Bell, San Jose, all of CA (US)

(73) Assignee: Spectra-Physics Lasers, Inc., Mountain View, CA (US)

(*) Notice: Under 35 U.S.C. 154(b), the term of this patent shall be extended for 0 days.

(21) Appl. No.: 09/199,031

(22) Filed: Nov. 24, 1998

(51) Int. Cl.[7] ........................................ H01S 3/14
(52) U.S. Cl. ........................ 372/39; 372/75; 372/69
(58) Field of Search ......................... 372/39, 75, 69–72, 372/41

(56) References Cited

U.S. PATENT DOCUMENTS

| | | | |
|---|---|---|---|
| 5,287,373 | * 2/1994 | Rapopport et al. | 372/39 |
| 5,410,559 | * 4/1995 | Nighan, Jr. et al. | 372/39 |
| 5,574,740 | * 11/1996 | Hargis et al. | 372/41 |
| 5,577,060 | * 11/1996 | Nighan, Jr. et al. | 372/39 |
| 5,638,388 | 6/1997 | Nighan, Jr. et al. | 372/22 |
| 5,638,397 | 6/1997 | Nighan, Jr. et al. | 372/92 |
| 5,692,005 | 11/1997 | Maag et al. | 372/70 |

FOREIGN PATENT DOCUMENTS

WO 99/21250  4/1999 (WO).

OTHER PUBLICATIONS

Zhang et al., "Efficient Temoo Operation of ND: YV04 Laser End Pumped by Fibre–Coupled Diode Laser", Electronics Letters, GB, IEE Stevenage, vol. 33, No. 9; pp. 775–777; Apr. 24, 1997.

* cited by examiner

Primary Examiner—Leon Scott, Jr.
(74) Attorney, Agent, or Firm—Wilson Sonsini Goodrich & Rosati

(57) ABSTRACT

A high power, diode pumped laser has a $Nd:YVO_4$ gain media. Scaling to higher powers is achieved with the use of a low doped gain media, increasing the length of the gain media as well as increasing the pump volume. Passive cooling is extended to output powers of 10 W or greater.

37 Claims, 4 Drawing Sheets

LASERS WITH LOW DOPED GAIN MEDIUM

BACKGROUND OF THE INVENTION

1. Field of the Invention

This invention relates to diode pumped Nd:YVO$_4$ lasers, and more particularly to diode pumped Nd:YVO$_4$ lasers with Nd doping levels of less than 0.5%.

2. Description of Related Art

The most common gain media used for diode pumped lasers is Nd:YAG and efficient systems can be constructed by end pumping with laser diodes and laser diode arrays. To build an efficient end pumped Nd:YAG laser, the pump light from the diode, which is typically not in a diffraction limited beam, must be focussed tightly into the gain media. To obtain TEM$_{00}$ operation, which is desirable for many applications, the pump light must be focussed to a spot size smaller than the intracavity mode. In addition, since the pump light diverges more quickly than the intracavity mode, it must be absorbed in a short distance before it will diverge to a size larger than the intracavity mode. Thus tight focussing and short absorption depths were necessary to build efficient TEM$_{00}$ Nd:YAG lasers pumped by diode lasers and diode arrays. These techniques are described in U.S. Pat. Nos. 4,635,056; 4,701,929; and 4,756,003.

The pump power available from these diode pump sources has increased steadily from 1 W diodes to 20 W diode bars and most recently to 40 W bars at 809 nm. As the pump power increased, several problems were encountered scaling the Nd:YAG lasers to higher power. For the YAG host in particular, increased pump power per unit area leads to increased birefringence. The gain media depolarizes the intra cavity beam; this leads to losses when polarized output is desired. A solution to the birefringence problem is to substitute Nd:YLF as the gain media. YLF is a birefringent material and naturally produces polarized output, even under high thermal loading. YLF, however, suffers from fracture problems as the pump power and hence the thermal loading is increased. An alternative material which is also naturally polarized and less susceptible to fracture is Nd:YVO$_4$ (Nd:Vanadate or Vanadate).

As the pump power incident on the Vanadate crystal is increased, thermal lensing becomes the limiting factor. At high pump powers the lens becomes very strong with focal lengths as short as 10 cm. Although this strong lens can be largely compensated by clever cavity design, the aberrations in the lens eventually degrade the performance of the laser. Thus, in order to take advantage of the new higher power diode bars as pump sources, a solution to the aberrated thermal lens in Vanadate is needed.

The power of the lens in a diode pumped Vanadate laser is due to two major contributions: the lens due to the index change in the bulk and the lens due to the bulge in the surface of the crystal. One solution to reducing the surface bulge is to optically contact undoped Vanadate on the end of the gain media. These end caps do not reduce the lens in the bulk however, which is the subject of the following disclosure. Another technique to reduce the surface bulge is to pass the pump light through the crystal more than once. For example, a highly reflective coating for the pump light can be placed on the second surface of the crystal. The pump light will then pass twice through the crystal causing the pump to be absorbed more homogeneously throughout the crystal and causing less heating near the surface. Either of these techniques may be used in combination with the method described below to reduce the thermal lens even further.

There is a need for a Vanadate laser or laser system with higher powers. There is also a need for a Vanadate laser or laser system with a reduced lens in the bulk of the crystal.

SUMMARY OF THE INVENTION

Accordingly, an object of the invention is to provide a diode-pumped Nd:YVO$_4$ laser.

Another object of the invention is to provide a diode-pumped Nd:YVO$_4$ laser that is scalable to high power.

Yet another object of the invention is to provide a high power diode-pumped Nd:YVO$_4$ laser with a TEM$_{00}$ beam with high efficiency.

A further object of the invention is to provide a compact diode-pumped Nd:YVO$_4$ laser.

Yet another object of the invention is to provide a diode-pumped Nd:YVO$_4$ laser that is passively cooled.

These and other objects of the invention are achieved in a diode pumped laser with a first high reflector mirror and an output coupler that defines a resonator cavity. A first Nd:YVO$_4$ gain medium is positioned in the resonator cavity. The gain medium has an Nd doping level of less than 0.5% and a length of at least 4 mm. A first diode pump source supplies a first pump beam that is incident on a first pump face of the first Nd:YVO$_4$ gain medium.

In another embodiment of the invention, a diode pumped laser has a first high reflector mirror and an output coupler that defines a resonator cavity. A first Nd:YVO$_4$ gain medium is positioned in the resonator cavity with a pump volume of at least 8 mm$^3$. A first diode pump source supplies a first pump beam that end pumps a first pump face of the first Nd:YVO$_4$ gain medium.

In another embodiment of the invention, a diode pumped laser includes a first high reflector mirror and an output coupler that define a resonator cavity. A first Nd:YVO$_4$ gain medium is positioned in the resonator cavity. The Nd:YVO$_4$ gain medium has a length greater than 8 mm. A first diode pump source supplies a first pump beam that is incident on a first pump face of the first Nd:YVO$_4$ gain medium.

In another embodiment of the invention, a diode pumped laser includes a first high reflector mirror and an output coupler that define a resonator cavity. A first Nd:YVO$_4$ gain medium is positioned in the resonator cavity. The first Nd:YVO$_4$ gain medium has a doping level and a pump volume that permit the first Nd:YVO$_4$ gain medium to be passively cooled. A first diode pump source supplies a first pump beam that is incident on a first pump face of the first Nd:YVO$_4$ gain medium. The laser produces an output beam with a power of at least 5 watts at 532 nm.

In another embodiment of the invention, a diode pumped laser includes a first high reflector mirror and an output coupler that define a resonator cavity. A first Nd:YVO$_4$ gain medium is positioned in the resonator cavity. The first Nd:YVO$_4$ gain medium has a doping level and a pump volume selected to permit the first Nd:YVO$_4$ gain medium to be passively cooled. A first diode pump source supplies a first pump beam that is incident on a first pump face of the first Nd:YVO$_4$ gain medium. The laser produces an output beam with a power of at least 10 watts at 1064 nm.

DETAILED DESCRIPTION

Figure 1:
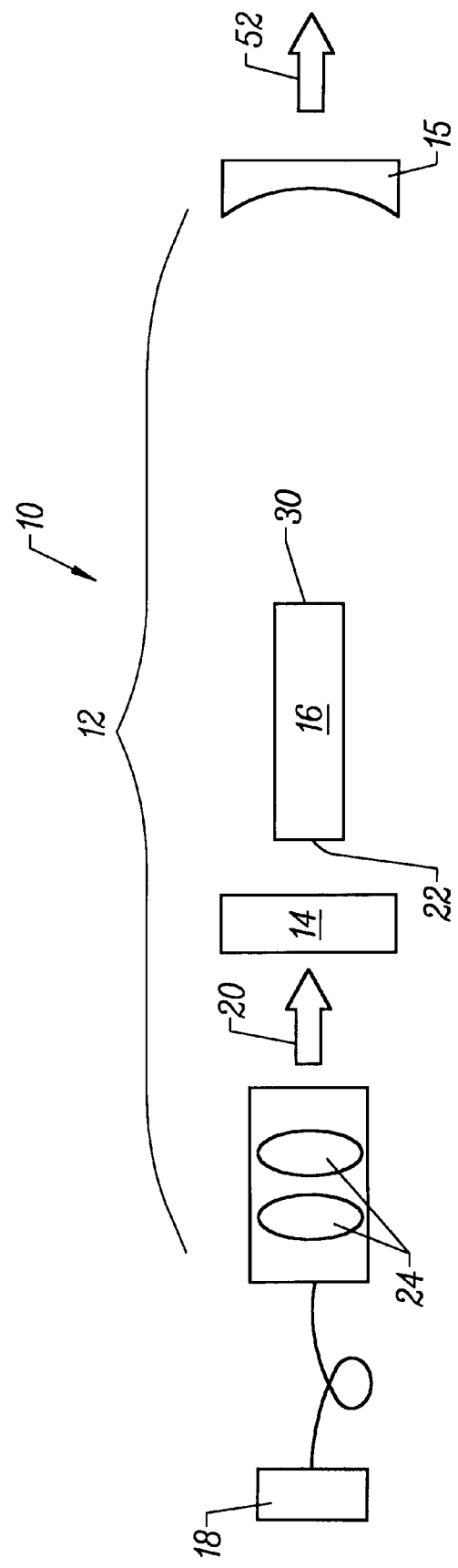
FIG. 1 is a schematic diagram of a laser of the present invention with a single Nd:YVO$_4$ gain medium pumped by a first diode pump source.

Referring now to FIG. 1, a diode pumped laser 10 has a resonator cavity 12 defined by a first high reflector mirror 14 and an output coupler 15 that defines a resonator cavity. A first Nd:YVO$_4$ gain medium 16 is positioned in the resonator cavity. A first diode pump source 18 supplies a first pump beam 20 that is incident on a first pump face 22 of first Nd:YVO$_4$ gain medium 16. Optionally, a back surface 30 of first Nd:YVO$_4$ gain medium 16 can be coated with a coating that is reflective for pump light from first pump beam 20.

First diode pump source 18 can be a single emitter, a broad stripe emitter or a diode bar. First diode pump source 18 can be associated with one or more lenses 24 in order to focus first pump beam 20 from first diode source 18 so that it is incident on gain medium 16. In one embodiment, two lenses are provided in a telescope arrangement to optimize the size of the pump beam. First diode pump source 18 can be fiber coupled. In one specific embodiment, first diode pump source 18 provides a first pump beam 20 with at least 20 watts of power incident on first pump face 22 of first Nd:YVO$_4$ gain medium 16.

In various embodiments, laser 10 has high efficiency with at least 35% of the pump power being converted to output power. In one embodiment, the pump power at 809 nm is converted efficiently to an output at 1064 nm with a TEM$_{00}$ output beam. Laser 10 can be a high power laser that produces at least 10 watts at 1064 nm.

Figure 2:
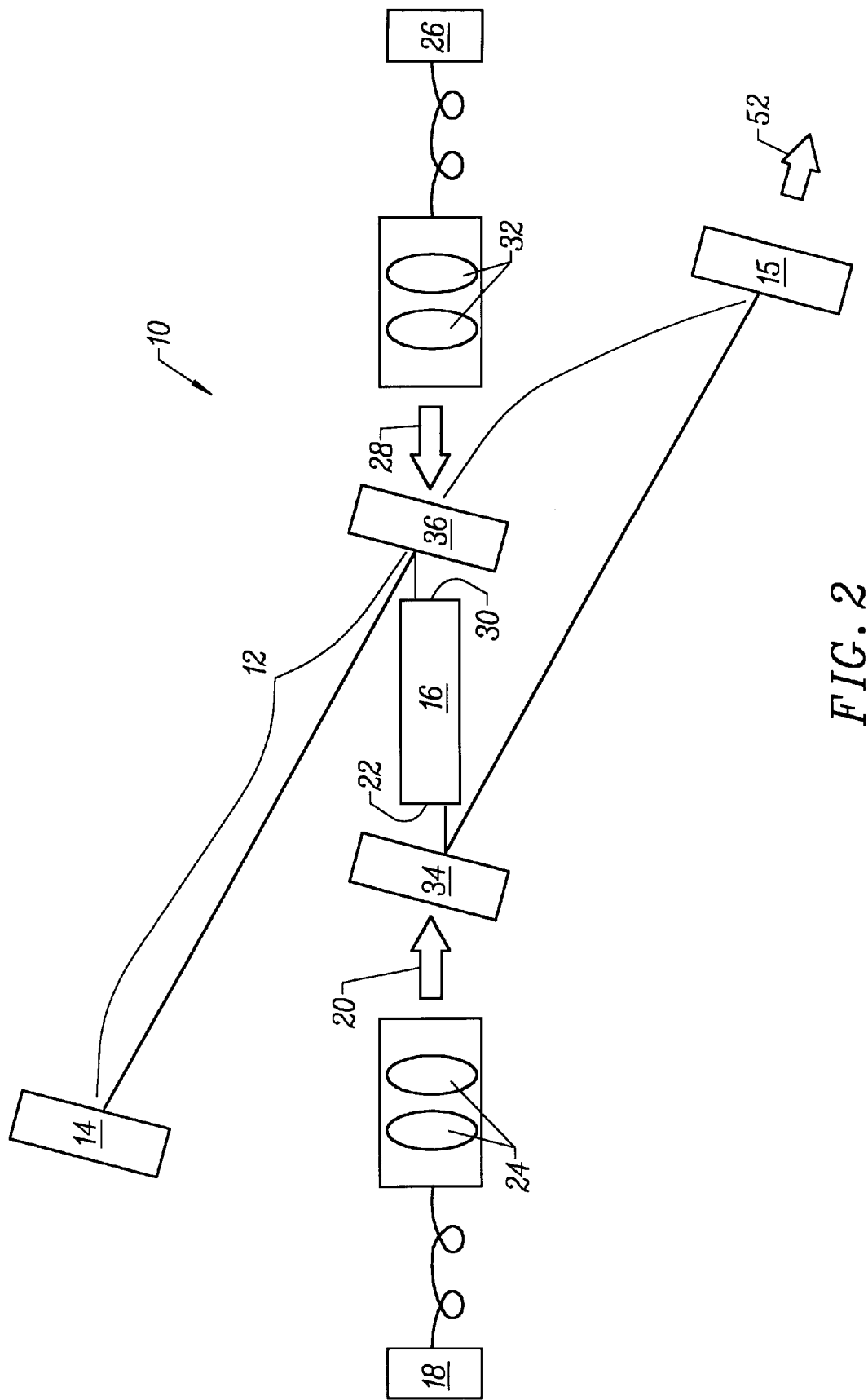
FIG. 2 is a schematic diagram of a laser of the present invention with a single Nd:YVO$_4$ gain medium pumped by a two diode pump sources.

Referring now to FIG. 2, laser 10 includes a second diode pump source 26 supplying a second pump beam 28 that is incident on a second pump face 30 of first Nd:YVO$_4$ gain medium 16. Second diode pump source 26 can be associated with one or more lenses 32 similar to lenses 24.

The embodiment illustrated in FIG. 2 is a Z fold geometry that includes fold mirrors 34 and 36 which can be highly reflective at 1064 nm and highly transmissive at 809 nm.

Figure 3:
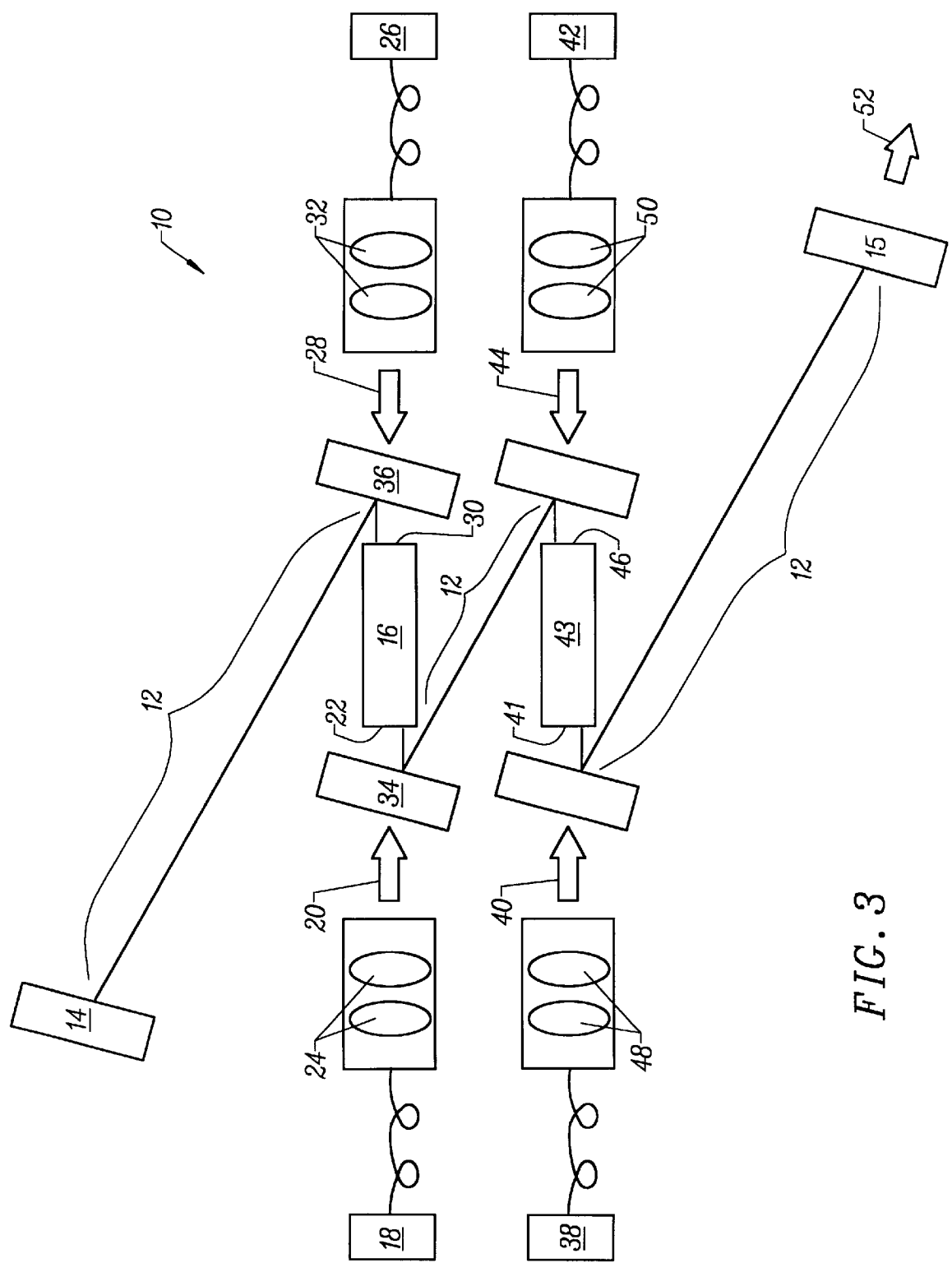
FIG. 3 is a schematic diagram of a laser of the present invention with a first Nd:YVO$_4$ gain medium pumped by first and second diode pump sources, and a second Nd:YVO$_4$ gain medium pumped by third and fourth diode pump sources.
Figure 4:
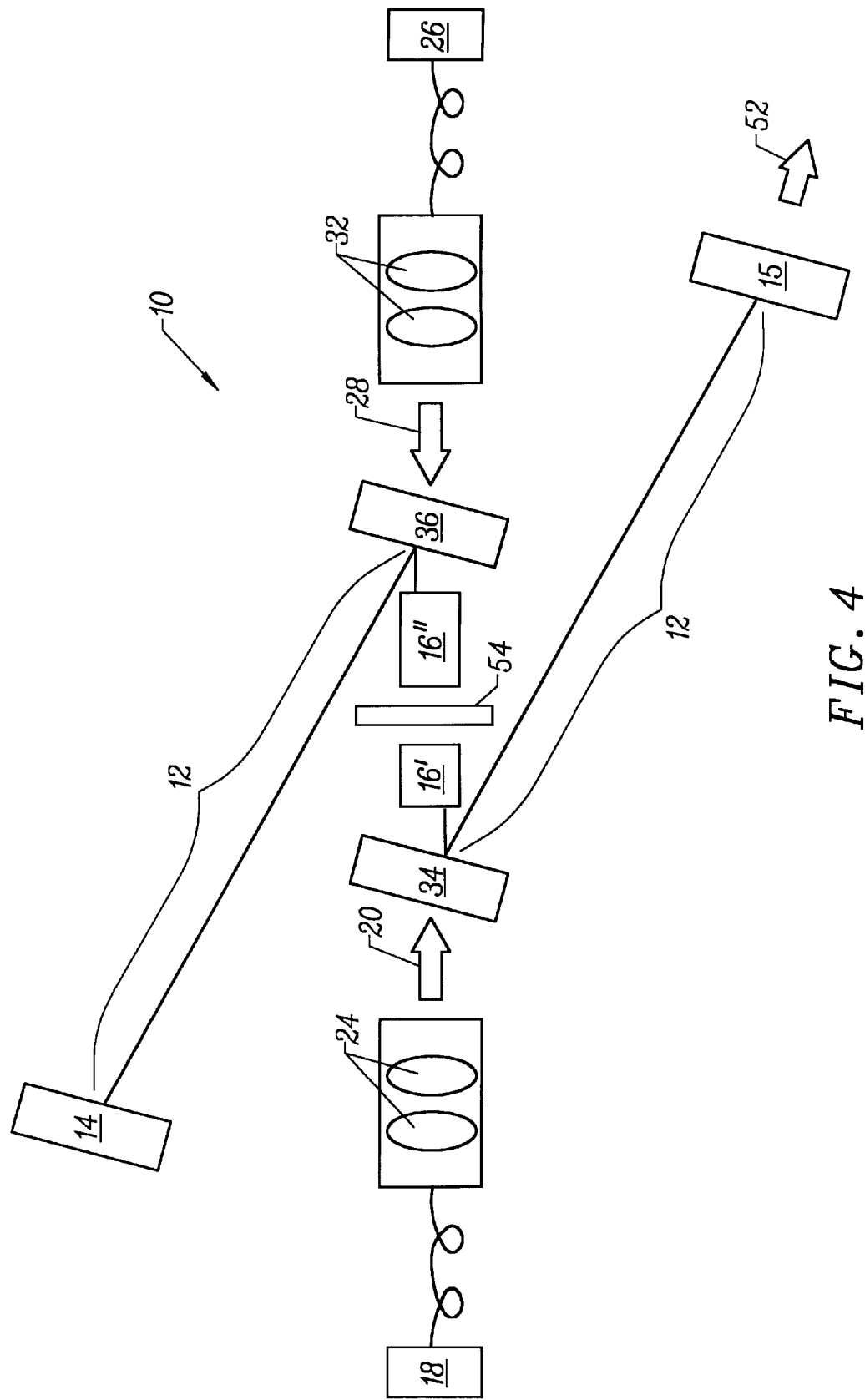
FIG. 4 is a schematic diagram of a laser of the present invention with two shorter Nd:YVO$_4$ crystals that effectively act as a single crystal; illustrated is an aperture positioned between the two crystals.

Another embodiment of laser 10 is illustrated in FIG. 3 that includes first and second Nd:YVO$_4$ gain media with four diode pump sources. A third diode pump source 38 produces a third pump beam 40 that is incident on first pump face 41 of second Nd:YVO$_4$ gain medium 43. A fourth diode pump source 42 produces a fourth pump beam 44 incident on a second pump face 46 of second Nd:YVO$_4$ gain medium 43. Optionally included are one or more telescopic lens arrangements 48 and 50. In all embodiments illustrated in FIGS. 1–4, laser 10 produces an output beam 52.

In various embodiments, first and second Nd:YVO$_4$ gain medium 16 and 43 can have Nd doping levels of less than 0.5%, 0.4%, 0.3%, 0.2% and 0.1%. First and second Nd:YVO$_4$ gain medium 16 and 43 can have pump volumes of at least 8 mm$^3$, 10 mm$^3$ or 12 mm$^3$.

The effective absorption length of Nd:YVO$_4$ gain medium 16 depends primarily on 3 parameters: the crystal doping, the pump wavelength and the crystal length. To increase the absorption depth beyond the typical value of 4 to 8 mm, first a longer crystal can be used. A combination of lower doping and detuning of the pump wavelength away from the peak of the absorption can be used so that the pump power is distributed throughout the entire crystal. This can also be achieved by broadening the pump bandwidth around the peak of the absorption. The "pump volume" is defined as the volume in which the gain media is excited by the pump. Typically, the pump volume is shaped like a cylinder with a diameter determined by the diameter of the pump light and a length determined by the crystal length.

Typical Vanadate systems use a pump diameter of 0.7 mm and a crystal length of 4 or 8 mm. Thus the pump volume would be 1.5 or 3 mm$^3$ respectively. With a Nd doping of 1% in a 4 mm crystal or 0.5% in an 8 mm crystal, approximately 90% of the pump light is absorbed. When greater than 13 W of pump light at the peak absorption wavelength for Nd:Vanadate (809 nm) is incident on one face of the crystal, the thermal lens becomes sufficiently aberrated to reduce the laser efficiency.

In one embodiment of the invention, the thermal lens is reduced by increasing the pump mode to 1.1 mm, increasing the crystal length to 12 mm and reducing the Nd doping to 0.27%. In this case the pump volume is increased to 12 mm$^3$. Pump powers up to 26 W on one face have been used without reduced laser efficiency. For high power systems, this crystal configuration can be used with 26 W of pump power on each of the two faces of the crystal.

First and second Nd:YVO$_4$ gain medium 16 and 43 can have lengths greater than 8 mm, 10 mm, 12 mm or 16 mm. The lengths of first and second Nd:YVO$_4$ can be achieved with a single crystal or by positioning two crystals 16' and 16" (FIG. 4) in close proximity to each other or in a contacting relationship. Crystals 16' and 16" are positioned sufficiently close to each other to act as a single crystal. It will be appreciated that one of both of the two crystals can be coated, or an intracavity element, including but not limited to an aperture 54, can be positioned between crystals 16' and 16".

Low power diode pumped solid state lasers can be "passively cooled". For purposes of this disclosure passive cooling is achieved by conducting the heat away using metal components in intimate contact with the gain media. These metal components may also be attached to fins or heat spreading plates. Prior to this invention, as the pump power was increased, "active cooling" methods become necessary to keep the laser from having extended warm-up times or fluctuating performance as the ambient temperature was varied. Active cooling methods included: water cooled heat sinks, TE coolers and fans. With the present invention, reducing the thermal lens in a Vanadate laser permits the use of passive cooling to obtain high performance at higher pump powers and hence higher output powers. Vanadate lasers can now be operated at 10 W average power or frequency doubled to 5 W average power in the green with only passive cooling.

In various embodiments, laser 10 is compact. Compactness is achieved by passive cooling and/or the use of fiber-coupled diode bars as the pump source. Compactness is also achieved with the use of fiber-coupled diode bars. By placing the diode bars in the power supply, cooling of the diode source is eliminated from the laser head. Compactness provides greater thermal and mechanically stability of laser 10.

First, second, third and fourth diode pump sources 18, 26, 38 and 42 can be fiber coupled. Preferably, laser 10 is end-pumped by first, second, third and fourth diode pump sources 18, 26, 38 and 42. In one embodiment, first, second, third and fourth diode pump sources 18, 26, 38 and 42 can produce at least 20 watts of power incident upon their respective pump faces of first and second Nd:YVO$_4$ gain medium 16 and 43 respectively. In the different embodiments of FIGS. 1–3, output beam 52 can have a power of at least 5 watts, 7 watts and 10 watts at 532 nm. Output beam 52 can have a power of at least 10 watts, 15 watts and 20 watts at 1064 nm.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A diode pumped laser, comprising:
   a first high reflector mirror and an output coupler defining a resonator cavity;
   a first Nd:YVO$_4$ gain medium positioned in the resonator cavity, the gain medium having a uniform doping level of less than 0.5% to reduce thermal lensing and a length of at least 4 mm to absorb a substantial portion of a pump bean; and
   a first diode pump source supplying a first pump beam that is incident on a first pump face of the first Nd:YVO$_4$ gain medium.

2. The laser of claim 1, wherein the doping level is no greater than 0.4%.

3. The laser of claim 1, wherein the doping level is no greater than 0.3%.

4. The laser of claim 1, wherein the doping level is no greater than 0.2%.

5. The laser of claim 1, wherein the doping level is no greater than 0.1%.

6. The laser of claim 1, wherein the doping level is 0.27%.

7. The laser of claim 1, wherein a length of the first Nd:YVO$_4$ gain medium is at least 8 mm.

8. The laser of claim 1, wherein the first Nd:YVO$_4$ gain medium is end-pumped by the first pump beam.

9. The laser of claim 1, wherein the first Nd:YVO$_4$ gain medium has a pump volume of at least 8 mm$^3$.

10. The laser of claim 1, wherein the first Nd:YVO$_4$ gain medium has a pump volume of at least 10 mm$^3$.

11. The laser of claim 1, wherein the first diode pump source is a fiber coupled diode pump source.

12. The laser of claim 11, wherein the first diode pump source provides a pump beam with at least 20 watts of power incident on the first pump face of the first Nd:YVO$_4$ gain medium.

13. The laser of claim 1, further comprising:
   a second diode pump source supplying a second pump beam that is incident on a second pump face of the first Nd:YVO$_4$ gain medium.

14. The laser of claim 13, wherein the first and second diode pump sources are fiber coupled.

15. The laser of claim 14, wherein the second diode pump source provides a pump beam with at least 20 watts of power incident on the second pump face of the first Nd:YVO$_4$ gain medium.

16. The laser of claim 13, further comprising:
   a second Nd:YVO$_4$ gain medium positioned in the resonator cavity;
   a third diode pump source supplying a third pump beam that is incident on a first pump face of the second Nd:YVO$_4$ gain medium; and
   a fourth diode pump source supplying a fourth pump beam that is incident on a second pump face of the second Nd:YVO$_4$ gain medium.

17. The laser of claim 16, wherein the first, second, third and fourth diode pump sources are fiber coupled diode pump sources.

18. The laser of claim 1, wherein the laser produces an output beam with a power of at least 10 watts at 532 nm.

19. The laser of claim 1, wherein the laser produces an output beam with a power of at least 20 watts at 1064 nm.

20. The laser of claim 1, wherein the length of the first Nd:YVO$_4$ gain medium is greater than 10 mm.

21. The laser of claim 1, wherein the length of the first Nd:YVO$_4$ gain medium is greater than 12 mm.

22. The laser of claim 1, wherein the length of the first Nd:YVO$_4$ gain medium is greater than 16 mm.

23. A diode pumped laser, comprising:
   a first high reflector mirror and an output coupler defining a resonator cavity;
   a first Nd:YVO$_4$ gain medium positioned in the resonator cavity with uniform doping of 0.5% or less and a pump volume of at least 8 mm$^3$ to reduce thermal lensing; and
   a first diode pump source supplying a first pump beam that end pumps a first pump face of the first Nd:YVO$_4$ gain medium.

24. The laser of claim 23, wherein the pump volume is at least 10 mm$^3$.

25. The laser of claim 23, wherein the pump volume is at least 12 mm$^3$.

26. The laser of claim 23, wherein a doping level of the first Nd:YVO$_4$ gain medium is 0.27%.

27. The laser of claim 23, wherein a length of the first Nd:YVO$_4$ gain medium is greater than 8 mm.

28. The laser of claim 23, wherein the first diode pump source is fiber coupled.

29. The laser of claim 28, wherein the first diode pump source provides a pump beam with at least 20 watts of power incident on the first pump face of the first Nd:YVO$_4$ gain medium.

30. The laser of claim 23, further comprising:
   a second diode pump source supplying a second pump beam that is incident on a second pump face of the first Nd:YVO$_4$ gain medium.

31. The laser of claim 30, wherein the first and second diode pump sources are fiber coupled.

32. The laser of claim 31, wherein the second diode pump source provides a pump beam with at least 20 watts of power incident on the second pump face of the first Nd:YVO$_4$ gain medium.

33. The laser of claim 30, further comprising:
   a second Nd:YVO$_4$ gain medium positioned in the resonator cavity;
   a third diode pump source supplying a third pump beam that is incident on a first pump face of the second Nd:YVO$_4$ gain medium; and
   a fourth diode pump source supplying a fourth pump beam that is incident on a second pump face of the second Nd:YVO$_4$ gain medium.

34. The laser of claim 33, wherein the first, second, third and fourth diode pump sources are fiber coupled.

35. The laser of claim 23, wherein the laser produces an output beam with a power of at least 10 watts at 532 nm.

36. The laser of claim 23, wherein the laser produces an output beam with a power of at least 20 watts at 1064 nm.

37. A diode pumped laser, comprising:
   a first high reflector mirror and an output coupler defining a resonator cavity;

a first Nd:YVO$_4$ gain medium positioned in the resonator cavity and having a uniform doping level of less than 0.5% to reduce thermal lensing and a length greater than 8 mm to absorb a substantial portion of a pump beam; and a first diode pump source supplying a first pump beam that is incident on a first pump face of the first Nd:YVO$_4$ gain medium.

\* \* \* \* \*